(12) United States Patent
Horikawa et al.

(10) Patent No.: US 9,163,381 B2
(45) Date of Patent: Oct. 20, 2015

(54) FOOTRESTS AND FLOOR MATS FOR CONSTRUCTION MACHINERY

(75) Inventors: Hitoshi Horikawa, Higashimatsuyama (JP); Nobuyuki Ohta, Kawagoe (JP); Shinjirou Ohki, Hitachinaka (JP)

(73) Assignee: KOMATSU LTD., Minato-ku, Tokyo (JP)

( * ) Notice: Subject to any disclaimer, the term of this patent is extended or adjusted under 35 U.S.C. 154(b) by 0 days.

(21) Appl. No.: 14/411,754

(22) PCT Filed: Sep. 14, 2012

(86) PCT No.: PCT/JP2012/073656
§ 371 (c)(1),
(2), (4) Date: Dec. 29, 2014

(87) PCT Pub. No.: WO2014/002298
PCT Pub. Date: Jan. 3, 2014

(65) Prior Publication Data
US 2015/0176248 A1 Jun. 25, 2015

(30) Foreign Application Priority Data

Jun. 29, 2012 (JP) ................................ 2012-146783

(51) Int. Cl.
*B62J 25/00* (2006.01)
*E02F 9/16* (2006.01)
*B60N 3/04* (2006.01)

(52) U.S. Cl.
CPC .. *E02F 9/16* (2013.01); *B60N 3/048* (2013.01)

(58) Field of Classification Search
CPC .................................. E02F 9/16; B60N 3/048
See application file for complete search history.

(56) References Cited

U.S. PATENT DOCUMENTS

2011/0049932 A1   3/2011   Hobenshield et al.

FOREIGN PATENT DOCUMENTS

| DE | 102007052568 A1 | * | 5/2009 |
|----|-----------------|---|--------|
| JP | 10131235 A | * | 5/1998 |
| JP | 2002105986 A | | 4/2002 |
| JP | 2003020687 A | | 1/2003 |
| JP | 2009144444 A | | 7/2009 |

OTHER PUBLICATIONS

International Search Report (ISR) dated Dec. 18, 2012 issued in International Application No. PCT/JP2012/073656.
International Preliminary Report on Patentability (IPRP) including Written Opinion (in English) dated Dec. 31, 2014, issued in International Application No. PCT/JP2012/073656.

* cited by examiner

*Primary Examiner* — Lori L Lyjak
(74) *Attorney, Agent, or Firm* — Holtz, Holtz, Goodman & Chick PC

(57) ABSTRACT

A wheel loader includes: a floor for a driving operation; an operator's seat for an operator to be seated; and a trainer's seat for a trainer to be seated, the operator's seat and the trainer's seat being provided in parallel to each other. A footrest of the wheel loader includes an operator's footrest and a trainer's footrest respectively having placement surfaces on which adjacent feet of the seated operator and trainer are respectively placed. The operator's footrest and the trainer's footrest are integrated with each other.

6 Claims, 5 Drawing Sheets

FOOTRESTS AND FLOOR MATS FOR CONSTRUCTION MACHINERY

TECHNICAL FIELD

The present invention relates to a footrest and a floor mat in a construction machine.

BACKGROUND ART

In typical construction machines such as a wheel loader and a hydraulic excavator, a footrest may be provided on a floor such that an operator can step on the footrest to keep his/her balance during operations. The footrest differs depending on kinds of the construction machines. For example, since working equipment of the hydraulic excavator is actuated solely by manually operating working equipment levers, the operator needs to keep his/her balance by applying a load with both his/her unused feet. Accordingly, footrests are respectively provided under his/her right and left feet (see, for example, Patent Literatures 1 and 2).

In a large construction machine used in a mine and the like, a trainer occasionally rides on the machine with an inexperienced operator in order to train the operator. For this reason, a trainer's seat for the trainer to be seated is provided next to an operator's seat for the operator to be seated.

CITATION LIST

Patent Literature(s)

Patent Literature 1: JP-A-2002-105986
Patent Literature 2: JP-A-2003-20687

SUMMARY OF THE INVENTION

Problem(s) to be Solved by the Invention

However, since no footrest is conventionally provided for the trainer, the trainer is likely to be forced to assume an unbalanced posture during operations.

Accordingly, it is desired to also provide a footrest for the trainer. However, since a seating space for the trainer is originally narrower than that for the operator, if the footrest is simply provided in such a space, the trainer feels his/her feet cramped in such a narrow space to adversely deteriorate his/her comfort.

In typical construction machines, a synthetic rubber-made floor mat is provided on a floor for a driving operation. However, since the footrest is often provided by a metal plate fixed to a vehicle body frame, an opening is provided in the floor mat and the footrest is exposed through the opening.

Since the floor mat is washed with water for cleaning, washing water leaks from the opening to a back side of the floor mat, or dirt and the like drop off a foot sole placed on the footrest into the opening, which requires additional work for cleaning. Provision of the footrest for the trainer increases an opening, which further requires additional work.

An object of the invention is to provide a footrest in a construction machine so that both of an operator and a trainer can step on the footrest to keep their balance without losing comfort of the trainer.

In addition to the above object of the invention, an object of the invention is to provide an easily cleanable floor mat in a construction machine even when the footrest is provided for both of the operator and the trainer.

Means for Solving the Problem(s)

According to a first aspect of the invention, a footrest in a construction machine, in which the construction machine includes: a floor for a driving operation; an operator's seat for an operator to be seated; and a trainer's seat for a trainer to be seated, the operator's seat and the trainer's seat being provided in parallel to each other on the floor, includes: an operator's footrest with a placement surface configured to receive a foot of the seated operator; and a trainer's footrest with a placement surface configured to receive a foot of the seated trainer, the operator's footrest and the trainer's footrest being adjacent to or integrated with each other.

Herein, the wording of "integrated" also encompasses an arrangement in which the operator's footrest and the trainer's are adjacent to each other without a gap therebetween.

In the footrest according to a second aspect of the invention, the placement surface of the operator's footrest projects beyond the placement surface of the trainer's footrest.

In the footrest according to a third aspect of the invention, a width of the placement surface of the trainer's footrest is larger than a width of the placement surface of the operator's footrest.

In the footrest according to a fourth aspect of the invention, the placement surface of the operator's footrest and the placement surface of the trainer's footrest are disposed in a manner to form a wide angle opening in a front direction in a plan view.

Herein, "a front direction" is in line with a front direction of the operator and the trainer seated in the same direction.

In the footrest according to a fifth aspect of the invention, the operator's footrest and the trainer's footrest respectively include: brackets provided on a floor plate of the floor, the brackets respectively having inclined surfaces corresponding to the placement surfaces; and projections integrally molded in a form of a floor mat covering the brackets and the floor plate, the projections respectively having the placement surfaces.

A floor mat according to a sixth aspect of the invention is used in the construction machine provided with the footrest according to the fifth aspect of the invention, in which the floor mat covers the brackets and the floor plate and is integrally molded with the projections.

According to the first aspect of the invention, since the footrest is provided by the operator's footrest and the trainer's footrest, the footrest can be resistant to the load applied not only by the operator but also by the trainer.

Moreover, since the operator's footrest and the trainer's footrest are adjacent to or integrated with each other, the operator's footrest and the trainer's footrest are used for adjacent ones of the operator's feet and the trainer's feet. For this reason, the footrest is disposed in a wide space that is defined near the operator relative to the part near the trainer's feet, so that the space for placing the trainer's feet can be sufficiently secured and the trainer's comfort can be favorably kept.

According to the second aspect of the invention, since the placement surface of the operator's footrest projects beyond the placement surface of the trainer's footrest, the trainer's foot is blocked by a step between the placement surfaces, so that the trainer's foot can be prevented from shifting from the trainer's footrest to the operator's footrest not to interfere with the operator's foot (i.e., not to disturb the operator resisting the load).

According to the third aspect of the invention, the width of the placement surface of the trainer's footrest is larger than the width of the placement surface of the operator's footrest. Accordingly, the position for the trainer's foot to be placed can be adjusted according to a foot condition of the operator placed on the placement surface of the operator's footrest to prioritize the foot condition of the operator. Consequently, the operator does not need to pay unnecessary attention during a practical operation.

According to the fourth aspect of the invention, the placement surface of the operator's footrest and the placement surface of the trainer's footrest are disposed in a manner to form a wide angle opening substantially in the front direction in a plan view. With this arrangement, the placement surface of the operator's footrest faces the operator's seat while the placement surface of the trainer's footrest faces the trainer's seat. Accordingly, since the placement surfaces face in different directions, the operator can reliably place his/her foot on the placement surface of the operator's footrest while the trainer can reliably place his/her foot on the placement surface of the trainer's footrest. In other words, the operator and the trainer can easily recognize respective areas for the adjacent feet to be placed, thereby preventing mutual interference.

According to the fifth and sixth aspects of the invention, since the projections of the footrest are integrally molded with the floor mat, there is no joint line or gap at an interface between the floor mat and the footrest. Accordingly, water stopping performance around the footrest can be reliably secured and washing water for cleaning is prevented from leaking to the back side of the floor mat, and sand, dirt and the like dropped on the floor mat are prevented from reaching the back side of the floor mat, thereby facilitating cleaning.

Moreover, since the footrest is reinforced by the brackets provided on the floor plate, the footrest can be reliably resistant to the load applied by the feet of the operator and the trainer, thereby keeping a favorable posture of each of the operator and the trainer during operations.

BRIEF DESCRIPTION OF DRAWING(S)

DESCRIPTION OF EMBODIMENT(S)

Exemplary embodiment(s) of the invention will be described below with reference to the attached drawings.

Figure 1:
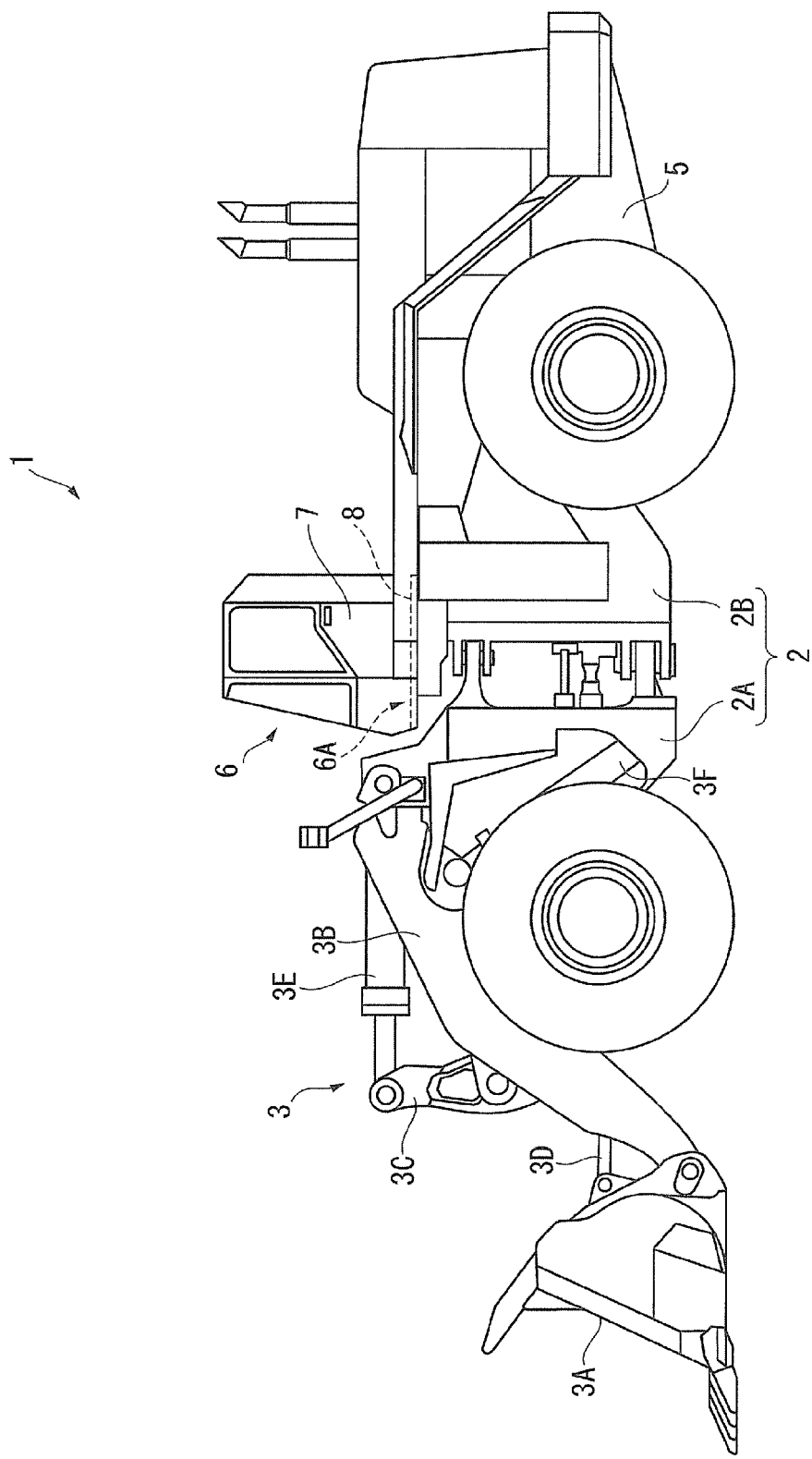
FIG. 1 is a side view showing a construction machine having a footrest in an exemplary embodiment of the invention.

FIG. 1 is a side view showing a large wheel loader 1 as a construction machine in the exemplary embodiment of the invention. In the following description, front, rear, right and left directions are the same as front, rear, right and left directions of an operator and a trainer seated in the same direction in a cab 6 as shown in FIG. 1.

In FIG. 1, the wheel loader 1 includes a vehicle body 2 including a front vehicle body 2A and a rear vehicle body 2B. Hydraulic working equipment 3 includes a bucket 3A, boom 3B, bell crank 3C, connecting link 3D, bucket cylinder 3E, boom cylinder 3F and the like. The hydraulic working equipment 3 is attached to a front side of the front vehicle body 2A (left in FIG. 1).

The rear vehicle body 2B includes a rear vehicle body frame 5 made of a thick metal plate and the like. The box-shaped cab 6 for the operator to be seated is provided to a front side of the rear vehicle body frame 5. An engine (not shown), hydraulic pumps driven by the engine, and the like are mounted to a rear side of the rear vehicle body frame 5.

A door 7 through which the operator enters the cab 6 is provided to one lateral side of the cab 6. A similar door may be provided to the other lateral side of the cab 6. However, in the wheel loader 1 in the exemplary embodiment, a door for an emergency exit, which is closed in a normal condition, is provided (not shown). The cab 6 is provided on a floor plate 8 on the rear vehicle body frame 5 and has a floor 6A for a driving operation.

Figure 2:
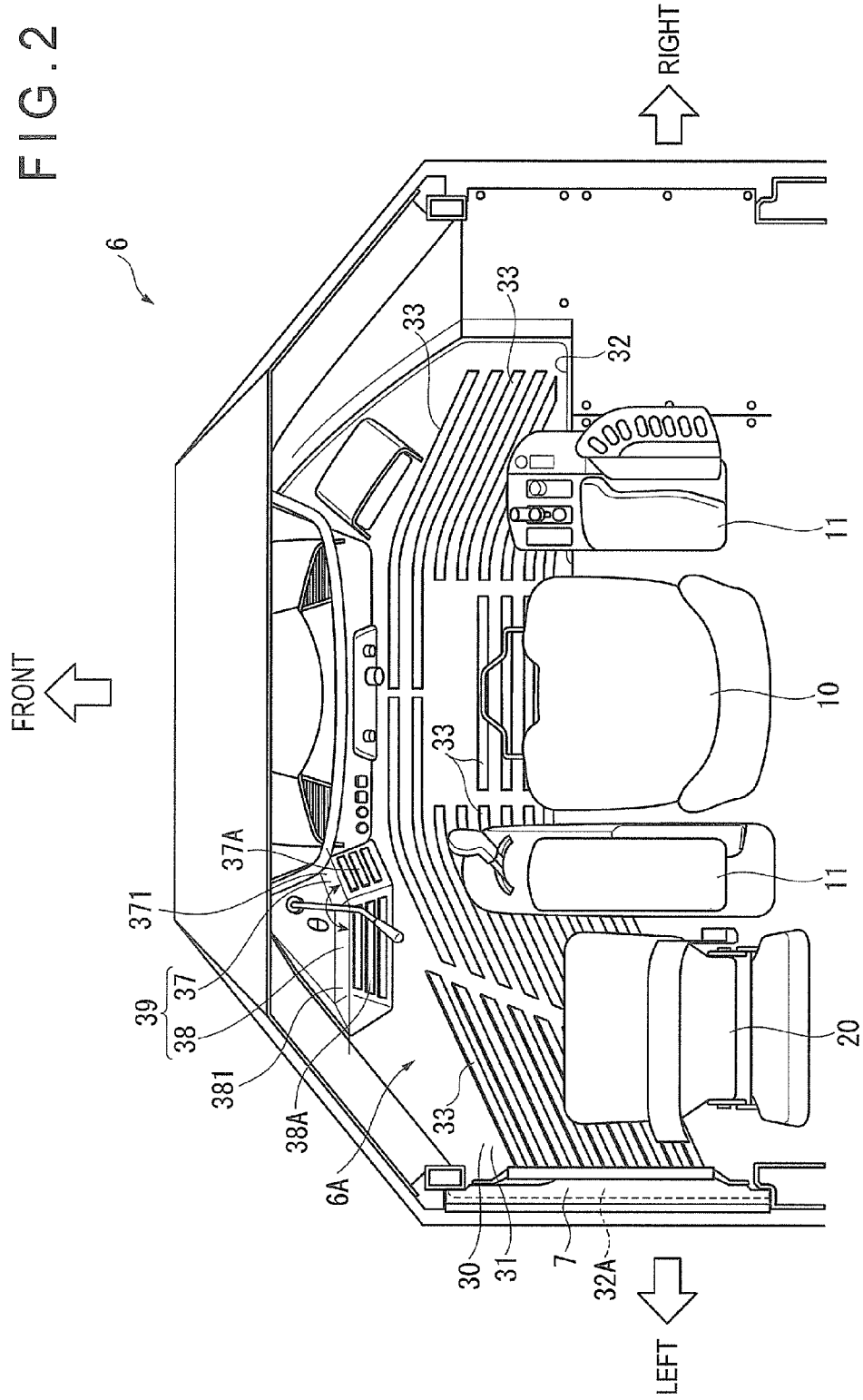
FIG. 2 is a plan view showing an inside of the cab.

FIG. 2 is a plan view showing an inside of the cab 6. As shown in FIG. 2, an operator's seat 10 for an operator to be seated is provided in the middle in the right-left direction of the floor 6A in the cab 6. The operator's seat 10, which is not illustrated in detail, is provided on a suspension device provided to the floor plate 8 (FIG. 1). Working-equipment consoles 11, 11 each having a working equipment lever and switches are respectively provided on right and left sides of the operator's seat 10.

A trainer's seat 20 is provided on a left side of the left working-equipment console 11. The trainer's seat 20 is for a trainer who trains an inexperienced operator and is provided in parallel to the operator's seat 10. The trainer's seat 20 may be attached on the floor plate 8 via an appropriate support frame. Alternatively, the trainer's seat 20 may be attached to a vertical frame, which is a rear side of the cab 6, via an appropriate support bracket. It is desirable that the trainer's seat 20 is foldable. A floor mat 30 made of synthetic rubber is laid on the floor 6A on the floor plate 8.

Figure 3:
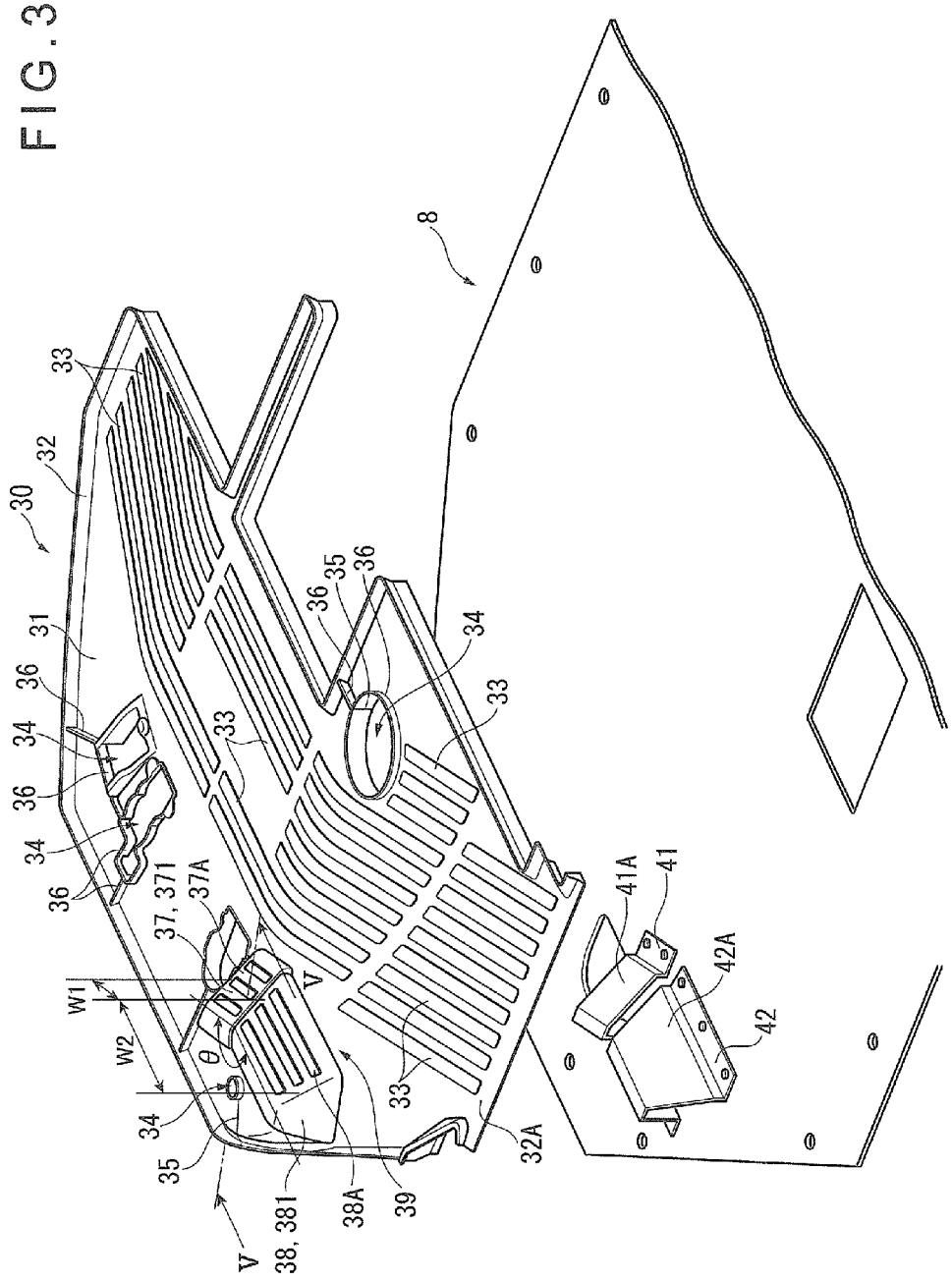
FIG. 3 is a perspective view showing a floor mat provided with the footrest and a floor plate provided with the floor mat.

FIG. 3 is a perspective view showing the floor mat 30 to be laid on the floor plate 8. In FIGS. 2 and 3, the floor mat 30 includes a planar portion 31 substantially covering the entire floor 6A and a flange 32 standing along an outer circumference of the planar portion 31. Note that a portion corresponding to the door 7 (FIG. 2) of the planar portion 31 is a sweepout portion 32A having no flange 32.

The floor mat 30 is washed with water while being kept laid in the cab 6. The washing water is stopped by the surrounding flange 32 so as not to leak therethrough. The washing water is discharged outward from the sweepout portion 32A having no flange 32. In this arrangement, provision of projecting strips 33 in a stripe pattern on a surface of the planar portion 31 in a manner to be directed toward the sweepout portion 32A allows the washing water to be efficiently discharged. Even when the floor mat 30 is not washed with water, the sweepout portion 32A is used for sweeping sand, dirt and the like dropped on the floor mat 30.

On the planar portion 31, a plurality of openings 34 are provided in a manner to keep away from positions at which penetrating members such as an operational pedal, safety lever and support frame for the working-equipment console 11 are set. Slits 35 (partially shown in FIG. 3) are provided between the openings 34 and a periphery of the floor mat 30. Each of the slits 35 is pulled apart when the floor mat 30 is laid. The penetrating members are inserted through the slits 35. Washing water is prevented from leaking through the openings 34 and the slits 35 by providing the openings 34 and the slits 35 at positions higher than the planar portion 31 or by providing flanges 36 around the openings 34 and along edges of the slits 35.

The floor mat 30 in the exemplary embodiment further includes a projection 371 for an operator's footrest 37 and a projection 381 for a trainer's footrest 38. The projections 371 and 381 are integrally molded with the planar portion 31. The projections 371 and 381 are integrated with each other without a gap therebetween and project substantially in a trapezoidal shape in a longitudinal sectional view from the surface of the planar portion 31. Since there is no gap between the projections 371 and 381, sand and dirt do not enter a space between the two projections 371 and 381, thereby facilitating cleaning. In the exemplary embodiment, the operator's footrest 37 and the trainer's footrest 38 define a footrest 39 of the invention.

Specifically, the operator's footrest 37 is located in the left front of the operator's seat 10 and is used for a left foot of the operator. Accordingly, the projection 371 of the operator's footrest 37 is provided with a placement surface 37A facing the operator's seat 10. The placement surface 37A is formed to be inclined surface that is inclined forward in an upper direction. The operator can resist a load to keep his/her balance by placing his/her sole on the placement surface 37A while being seated on the operator's seat 10.

Similarly, the trainer's footrest 38 is located in the right front of the trainer's seat 20 and is used for a right foot of the trainer. Accordingly, the projection 381 of the trainer's footrest 38 is provided with a placement surface 38A facing the trainer's seat 20. The placement surface 38A is also formed to be inclined surface that is more inclined forward in the upper direction. The trainer can resist the load to keep his/her balance by placing his/her sole on the placement surface 38A while being seated on the trainer's seat 20.

A dimension of a space where the trainer is seated is restricted because the door 7 is situated close to the left side of the trainer. For this reason, in an attempt to also provide a footrest for a left foot of the trainer, it is conceivable that a size of a placement surface becomes extremely small to cause the footrest to insufficiently work. Accordingly, in the exemplary embodiment, a sufficient size of the placement surface 38A is secured by providing the trainer's footrest 38 in a space of the operator which is wider than the space of the trainer and by using the trainer's footrest 38 for the right foot of the trainer.

In this arrangement, a width W2 of the placement surface 38A of the trainer's footrest 38 is approximately twice as large as a width W1 of the placement surface 37A of the operator's footrest 37 (W2≈2×W1). Since the width W2 of the placement surface 38A of the trainer's footrest 38 is larger, the trainer can place his/her foot in a wide range. In other words, since the trainer can shift his/her foot over the placement surface 38A according to a position, a size and the like of the operator's foot placed on the placement surface 37A, the foot condition of the operator who performs a practical operation can be prioritized to avoid the operator from paying unnecessary attention.

The placement surface 37A projects beyond the placement surface 38A. In other words, the placement surface 37A is provided one step higher than the placement surface 38A. Since the trainer's foot is unlikely to shift from the placement surface 38A to the placement surface 37A by providing the step between the placement surfaces 37A and 38A, the trainer's foot is unlikely to interfere with the operator's foot and can be prevented from affecting a posture of the operator during the operations.

Further, as shown in FIG. 2, the placement surfaces 37A and 38A are disposed in a manner to respectively face the seats 10 and 20 to form an angle θ opening in the front direction in a plan view. With this arrangement, since the placement surfaces 37A and 38A are oriented in different directions, it is unlikely that the operator erroneously places his/her foot on the placement surface 38A or the trainer erroneously places his/her foot on the placement surface 37A, so that interference between the foot of the operator and the foot of the trainer can be prevented.

As shown in FIG. 3, the floor plate 8 is provided with a metallic bracket 41 for the operator's footrest 37 and a metallic bracket 42 for the trainer's footrest 38. The brackets 41 and 42 respectively support back sides of the projections 371 and 381 of the respective footrests 37 and 38. Accordingly, the brackets 41 and 42 project in a trapezoidal shape with inclined surfaces 41A and 42A inclined in directions corresponding to the respective placement surfaces 37A and 38A. Although the brackets 41 and 42 are separate from and adjacent to each other in the exemplary embodiment, the brackets 41 and 42 may be integrated with each other to form a single bracket.

Figure 4:
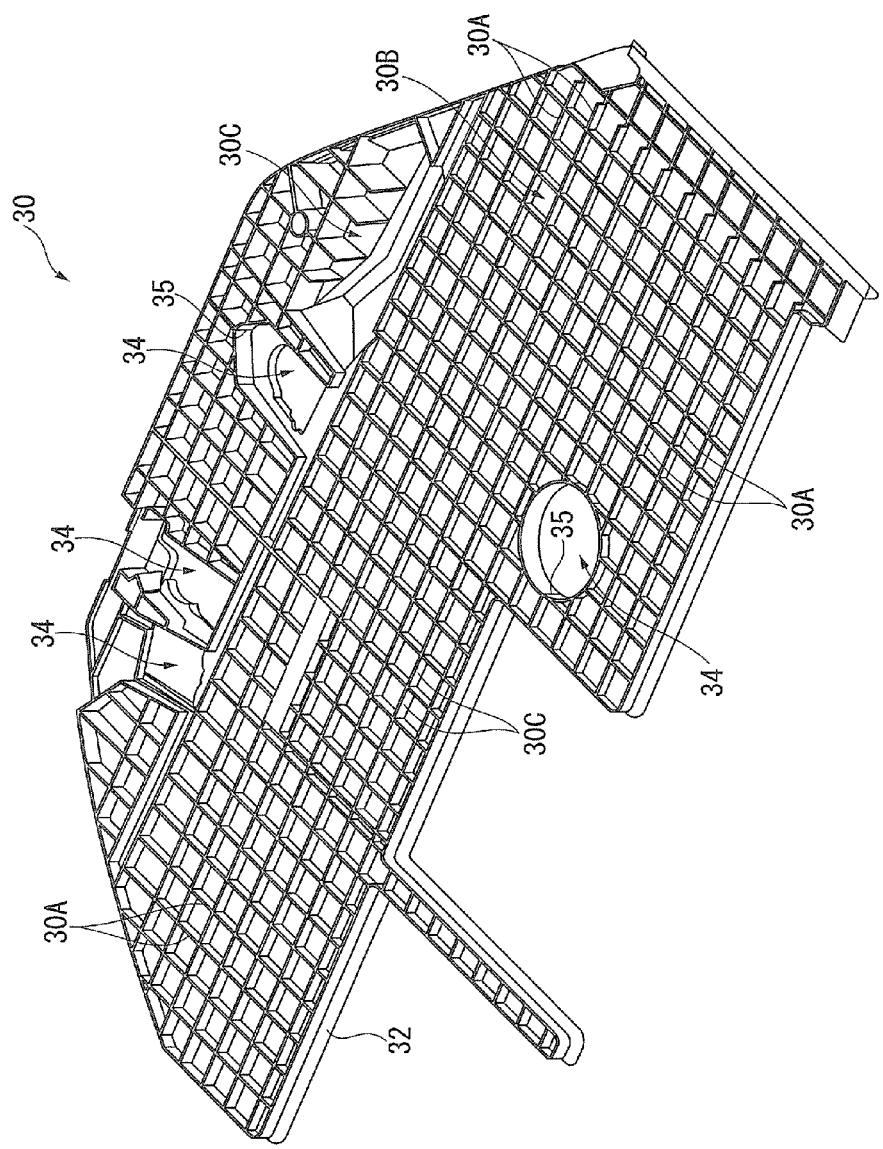
FIG. 4 is a perspective view showing a back side of the floor mat.

FIG. 4 shows a back side of the floor mat 30. The back side of the floor mat 30 is reinforced by a lattice rib 30B formed with a large number of projections 30A orthogonal to each other. Recesses 30C dented toward a front side of the floor mat 30 are provided at positions corresponding to the projections 371 and 381 of the floor mat 30. The brackets 41 and 42 are housed in the recesses 30C.

Figure 5:
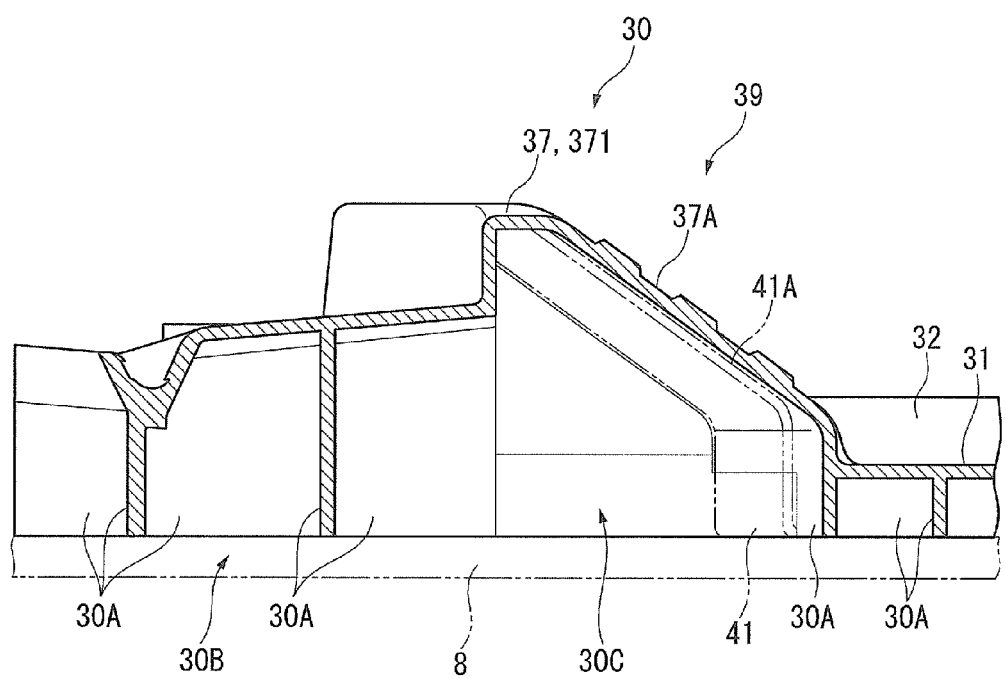
FIG. 5 is a cross-sectional view showing a relevant part of the floor mat and taken along a V-V line of FIG. 3.

FIG. 5 representatively shows the housed bracket 41 in two-dot chain lines. The inclined surface 41A of the bracket 41 is brought into contact with a back side of the placement surface 37A of the operator's footrest 37. Load applied by the operator for keeping his/her balance is transmitted to the bracket 41 through the placement surface 37A and the inclined surface 41A to be eventually received by the floor plate 8. The same applies to the trainer's footrest 38. The rib 30B may also be formed on a back side of the recesses 30C, thereby providing a predetermined rigidity to the floor mat to allow the floor mat to be resistant to the load applied with the feet. However, when the metallic brackets 41 and 42 are disposed, the metallic brackets 41 and 42 can be resistant to the significantly fluctuating load applied with the feet.

It should be understood that the scope of the invention is not limited to the above exemplary embodiment but includes modifications and improvements as long as an object of the invention is achievable.

For instance, in the above exemplary embodiment, the operator's footrest 37 is used for the left foot of the operator and the trainer's footrest 38 is used for the right foot of the trainer. However, when the trainer's seat 20 is positioned on the right side of the operator's seat 10, the operator's footrest may be provided for a right foot of the operator while the trainer's footrest may be provided for a left foot of the trainer, the operator's footrest and the trainer's footrest being integrated with each other to form a footrest.

Although the operator's footrest 37 and the trainer's footrest 38 are integrated with each other in the above exemplary embodiment, even when the operator's footrest 37 and the trainer's footrest 38 are adjacent to each other at a predetermined gap therebetween, the operator's footrest 37 and the trainer's footrest 38 provide the footrest of the invention. Herein, "a predetermined gap" means a gap at which the trainer's footrest is close to the operator's footrest enough not to cause an unnatural posture of the seated trainer, especially when the trainer sits in a narrow space and keeps his/her foot placed on the trainer's footrest, and at which the trainer's footrest is apart from the operator's footrest enough not to disturb cleaning therebetween.

Moreover, since it is only required that the operator's footrest for at least one of the operator's feet is provided adjacent to or integrally with the trainer's footrest for at least one of the trainer's feet, the operator's footrest is provided for one foot of the operator and another footrest may be provided for the other foot of the operator. Additionally, while the trainer's footrest is provided for one foot of the trainer, another footrest may be provided for the other foot of the trainer.

In the above exemplary embodiment, the projections 371 and 381 of the footrest 39 are provided on the floor mat 30. However, openings from which the brackets 41 and 42 are exposed may be provided on the floor mat 30. In this arrangement, the brackets 41 and 42 adjacent to each other provide the footrest of the invention. When the brackets 41 and 42 are integrated with each other, a single bracket provides the footrest of the invention. It should be noted that the placement surfaces of the exposed brackets may be covered with a rubber-made cover for slip prevention.

However, in terms of water stopping performance and easy cleaning, it is preferable that the floor plate 8 and the brackets 41 and 42 provided on the floor plate 8 are covered with the floor mat 30 in the same manner as in the above exemplary embodiment.

In the above exemplary embodiment, the wheel loader 1 is exemplarily described as the construction machine of the invention. However, the construction machine is not limited to the wheel loader, but may be any construction machine such as a hydraulic excavator, bulldozer, motor grader or dump truck.

In the above exemplary embodiment, the construction machine with the cab is described. However, the construction machine is not limited thereto, but may be a construction machine with a canopy in which the footrest of the invention is provided.

The invention claimed is:

1. A footrest in a construction machine, the construction machine comprising: a floor for a driving operation; an operator's seat for an operator to be seated; and a trainer's seat for a trainer to be seated, the operator's seat and the trainer's seat being provided in parallel to each other on the floor, the footrest comprising:

an operator's footrest with a placement surface configured to receive a foot of the seated operator; and a trainer's footrest with a placement surface configured to receive a foot of the seated trainer, the operator's footrest and the trainer's footrest being adjacent to or integrated with each other.

2. The footrest in the construction machine according to claim 1, wherein the placement surface of the operator's footrest projects beyond the placement surface of the trainer's footrest.

3. The footrest in the construction machine according to claim 1, wherein a width of the placement surface of the trainer's footrest is larger than a width of the placement surface of the operator's footrest.

4. The footrest in the construction machine according to claim 1, wherein the placement surface of the operator's footrest and the placement surface of the trainer's footrest are disposed in a manner to form a wide angle in a front direction in a plan view.

5. The footrest in the construction machine according to claim 1, wherein the operator's footrest and the trainer's footrest respectively comprise:

brackets provided on a floor plate of the floor, the brackets respectively having inclined surfaces corresponding to the placement surfaces; and projections integrally molded in a form of a floor mat covering the brackets and the floor plate, the projections respectively having the placement surfaces.

6. A floor mat to be used in the construction machine provided with the footrest according to claim 5, the floor mat covering the brackets and the floor plate and integrally molded with the projections.

* * * * *